US008984869B2

(12) United States Patent
Takayanagi et al.

(10) Patent No.: US 8,984,869 B2
(45) Date of Patent: Mar. 24, 2015

(54) EXHAUST GAS EMISSION CONTROL SYSTEM FOR DIESEL ENGINE

(75) Inventors: Ko Takayanagi, Tokyo (JP); Keisuke Okuda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 72 days.

(21) Appl. No.: 13/806,947

(22) PCT Filed: Aug. 22, 2011

(86) PCT No.: PCT/JP2011/068861
§ 371 (c)(1),
(2), (4) Date: Jan. 16, 2013

(87) PCT Pub. No.: WO2012/056798
PCT Pub. Date: May 3, 2012

(65) Prior Publication Data
US 2013/0104529 A1    May 2, 2013

(30) Foreign Application Priority Data
Oct. 27, 2010    (JP) .................... 2010-241469

(51) Int. Cl.
*F01N 3/025*    (2006.01)
*F01N 3/035*    (2006.01)
(Continued)

(52) U.S. Cl.
CPC .............. *F01N 3/0253* (2013.01); *F01N 3/035* (2013.01); *F02D 41/025* (2013.01);
(Continued)

(58) Field of Classification Search
USPC ........... 60/285, 286, 295, 297, 299, 303, 311, 60/320
See application file for complete search history.

(56) References Cited

U.S. PATENT DOCUMENTS

| 7,536,854 B2 * | 5/2009 | Da-Silva et al. ............. 60/295 |
| 2004/0204818 A1 * | 10/2004 | Trudell et al. ............. 701/114 |

(Continued)

FOREIGN PATENT DOCUMENTS

| CN | 1629460 | 6/2005 |
| CN | 101035970 | 9/2007 |

(Continued)

OTHER PUBLICATIONS

International Preliminary Report on Patentability and Written Opinion of the International Searching Authority issued May 14, 2013 in corresponding International Application No. PCT/JP2011/068861 (with English translation).

(Continued)

*Primary Examiner* — Thomas Denion
*Assistant Examiner* — Jorge Leon, Jr.
(74) *Attorney, Agent, or Firm* — Wenderoth, Lind & Ponack, L.L.P.

(57) ABSTRACT

An exhaust gas emission control system for a diesel engine, having an oxidation catalyst (DOC) (7) and a diesel particulate filter (DPF) (9) in an exhaust passage, wherein a late post-injection control unit (62), which injects fuel into a combustion chamber at a timing not contributing to combustion in DPF regeneration control, feedback controls a late post-injection amount such that a regeneration amount of soot regenerated by the DPF (9) becomes a target soot regeneration amount per unit time.

10 Claims, 10 Drawing Sheets

(51) Int. Cl.
*F02D 41/02* (2006.01)
*F02D 41/14* (2006.01)
*F02D 41/24* (2006.01)
*F02D 41/40* (2006.01)

(52) U.S. Cl.
CPC ......... *F02D 41/029* (2013.01); *F02D 41/1456* (2013.01); *F02D 41/2422* (2013.01); *F02D 41/405* (2013.01); *F02D 41/1467* (2013.01); *F02D 41/1446* (2013.01); *F02D 2200/0802* (2013.01); *F02D 2200/0812* (2013.01); *Y02T 10/44* (2013.01); *Y02T 10/26* (2013.01)
USPC ................. 60/297; 60/285; 60/286; 60/295; 60/299; 60/303; 60/311; 60/320

(56) References Cited

U.S. PATENT DOCUMENTS

| | | |
|---|---|---|
| 2005/0126161 A1 | 6/2005 | Otake et al. |
| 2008/0010971 A1* | 1/2008 | Gioannini et al. ............... 60/274 |
| 2008/0022660 A1* | 1/2008 | Reuter et al. .................... 60/286 |
| 2009/0188236 A1* | 7/2009 | Yokota ............................ 60/285 |
| 2009/0293456 A1* | 12/2009 | Rodman et al. ................. 60/286 |
| 2011/0047982 A1* | 3/2011 | Chen et al. ...................... 60/286 |

FOREIGN PATENT DOCUMENTS

| | | | |
|---|---|---|---|
| JP | 2004-36454 | 2/2004 | |
| JP | 2004183525 A * | 7/2004 | ............... F01N 3/02 |
| JP | 2005-201251 | 7/2005 | |
| JP | 3951619 | 8/2007 | |
| JP | 2007-239740 | 9/2007 | |
| JP | 2009-138702 | 6/2009 | |
| JP | 2010-71203 | 4/2010 | |
| JP | 2010-116105 | 5/2010 | |
| JP | 2010-174794 | 8/2010 | |

OTHER PUBLICATIONS

International Search Report issued Sep. 13, 2011 in International (PCT) Application No. PCT/JP2011/068861.
Notice of Allowance issued Sep. 22, 2014 in corresponding Korean Application No. 10-2012-7034034 (with English translation).
Office Action issued Oct. 20, 2014 in corresponding Chinese Application No. 201180031617.4, with English translation thereof.

* cited by examiner

S12: REGENERATION ELAPSED TIME [s] ≧ REGENERATION ELAPSED TIME THRESHOLD [s]

EXHAUST GAS EMISSION CONTROL SYSTEM FOR DIESEL ENGINE

TECHNICAL FIELD

This invention relates to an exhaust gas emission control system for use in a diesel engine, and in particular to regeneration control of a diesel particulate filter (hereafter, abbreviated as DPF) for collecting a particulate matter (hereafter, abbreviated as PM) contained in exhaust gas.

BACKGROUND ART

In the scheme of emission control for diesel engines, reduction of PM is as important as reduction of NOx. DPFs are known as effective means to reduce PM.

A DPF is a PM collecting device using a filter. When an engine is operating in a state where exhaust gas temperature is low, PM continues to accumulate on the DPF. Therefore, forced regeneration is performed to burn the PM (or soot in the PM) by forcibly raising the temperature.

In the DPF forced regeneration, late post-injection in which fuel is injected into cylinders (injection timing is so late that the fuel is not burned in the cylinders) is performed, and oxidation reaction is caused by an oxidation catalyst (hereafter, abbreviated as DOC) arranged upstream of the DPF, so that heat obtained by this reaction is utilized to keep the exhaust gas temperature in the DPF high enough (600 to 650° C.) to burn the soot deposited on the DPF.

In general, a late post-injection amount is subjected to feedback control such as PID control so that the temperature in the DPF is controlled at a target temperature. The target temperature is determined based on a DPF inlet gas temperature, a DPF outlet gas temperature, or a DPF internal temperature (these temperatures are referred to as the DPF temperature).

However, when the DPF temperature is controlled at a fixed value of the target temperature, problems as follows may be induced.

When the target temperature is set high, the temperature may possibly rise excessively when the soot deposited on the DPF is burned. For example, when the engine is idling, a state called "drop to idle" is produced, in which temperature tends to rise excessively. If a large amount of soot is deposited in this "drop to idle" state, the DPF internal temperature tends to rise rapidly and excessively.

When a critical soot deposition amount is defined as a soot deposition amount at which a DPF catalyst reaches a temperature (about 800 to 900° C.) at which it degrades in the "drop to idle" state, the DPF inlet temperature and the critical soot deposition amount assume a relationship as shown in FIG. 14. It can be seen, from this relationship, that as the soot deposition amount becomes greater, the DPF target temperature must be set to a lower value.

Particularly, in an initial stage of DPF regeneration in which the soot deposition amount is large, the risk of excessive temperature rise of the DPF is increased if the DPF temperature is high.

In contrast, if the target temperature is set low, the time required for regeneration is increased, and hence the risk is increased that late post-injected fuel falls from cylinder inner walls into an oil pan, causing oil dilution. FIG. 15 shows time variation of soot deposition amount during a regeneration process. It can be seen that the regeneration time becomes longer as the DPF regeneration temperature becomes lower.

It is known that the DPF target temperature can be controlled by varying the same based on some parameter. For example, Japanese Patent Application Publication No. 2007-239470 (Patent Document 1) describes that a target value of DPF inlet temperature is determined based on any one of soot deposition amount, change rate of soot deposition amount, DPF temperature, change rate of DPF temperature and the like.

Japanese Patent Application Publication No. 2009-138702 (Patent Document 2) describes that a target value of DPF inlet temperature is set according to the time elapsed from the start of forced regeneration of the DPF, and the target value is set lower as the time elapsed from the start of forced regeneration of the DPF becomes shorter. Furthermore, Japanese Patent Application Publication No. 2010-071203 (Patent Document 3) is also known as a document disclosing a technique to set the DPF inlet temperature target value.

Patent Document 1: Japanese Patent Application Publication No. 2007-239470
Patent Document 2: Japanese Patent Application Publication No. 2009-138702
Patent Document 3: Japanese Patent Application Publication No. 2010-071203

According to the technologies described in Patent Documents 1 to 3 in which regeneration conditions such as late post-injection amount are controlled so that the DPF temperature becomes a target DPF temperature, excessive rise of temperature is prevented by setting the target DPF temperature lower as the time elapsed from the start of forced regeneration becomes shorter.

However, when the control is performed based on a DPF temperature, the control cannot cope with significant change in temperature characteristics of the soot regeneration amount per unit time. This means that, the DPF internal temperature is raised by burning soot (by regeneration with $O_2$).

Therefore, a relationship between soot regeneration amount per unit time and DPF temperature when the soot deposition amount is fixed is represented by a trend as shown in FIG. 16. As shown in FIG. 16, the soot regeneration amount per unit time changes with respect to the DPF temperature not linearly but exponentially. Therefore, the soot regeneration amount per unit time is increased significantly as the DPF temperature rises, whereby the risk that rapid and excessive rise of temperature occurs is increased. For example, the soot regeneration rate when the DPF temperature is 630° C. is about twice as high as when it is 600° C.

Thus, when the control is performed based on DPF temperature, the soot regeneration amount per unit time cannot be detected correctly, which has a risk of excessive rise of temperature.

The soot regeneration amount per unit time and the soot regeneration rate can be calculated by equations (1) and (2) below. The relationship between soot regeneration amount per unit time and DPF temperature as shown in FIG. 16 can be obtained from these equations (1) and (2).

$$\text{Soot regeneration amount per unit time [g/s]} = \text{soot regeneration rate [1/s]} \times \text{soot deposition amount [g]} \quad (1)$$

$$\text{Soot regeneration rate [1/s]} = A \times \exp(-B/RT) \times QO_2^{\gamma} \quad (2)$$

where A, B, and $\gamma$ each denote a constant, R denotes a gas constant, T denotes a DPF temperature [K], and $QO_2$ denotes an $O_2$ flow rate [g/s].

DISCLOSURE OF THE INVENTION

When the control is performed based on DPF temperature, as described above, the soot regeneration amount per unit time cannot be detected correctly, and the situation in which the temperature is raised by burning of soot cannot be grasped correctly, which has a risk of excessive rise of temperature.

The invention has been made in view of these problems, and an object of the invention is to provide an exhaust gas emission control system for a diesel engine capable of preventing excessive rise of temperature and oil dilution, by setting a target soot regeneration amount per unit time, and directly controlling a soot regeneration amount per unit time is to be the target soot regeneration amount per unit time so that the regeneration temperature and the regeneration time are optimized.

In order to solve the aforementioned problems, the invention provides an exhaust gas emission control system for a diesel engine as an internal combustion engine, comprising, in an exhaust passage, an oxidation catalyst (DOC) and a diesel particulate filter (DPF) for collecting soot in exhaust gas so that the soot collected by the DPF is regenerated, the exhaust gas emission control system further including: a regeneration control device which controls a heating unit, when an amount of accumulated soot exceeds a predetermined value, to heat the DPF up to near a predetermined target temperature so as to burn and remove the accumulated soot, wherein the regeneration control device has a late post-injection control unit which injects fuel into a combustion chamber at a timing not contributing to combustion, and the late post-injection control unit feed-back controls a late post-injection amount such that a regeneration amount of the soot regenerated by the DPF becomes a target soot regeneration amount per unit time.

According to this invention, the late post-injection amount is controlled based on a soot regeneration amount per unit time. This solves the problem that the DPF temperature is raised rapidly and excessively by significant increase of the soot regeneration amount per unit time.

In this manner, the target soot regeneration amount per unit time is set and the late post-injection amount is controlled so that the soot regeneration amount per unit time becomes the target soot regeneration amount per unit time, whereby the temperature control for the DPF can be optimized. As a result, the risk of excessive rise of temperature and oil dilution can be minimized.

According to the invention, the late post-injection control unit may preferably control based on the target soot regeneration amount per unit time set to a fixed value.

In this manner, the soot regeneration amount per unit time is controlled constant with the target soot regeneration amount per unit time set to a fixed value, whereby the risk that the soot is rapidly burned can be minimized, and hence the excessive rise of temperature can be prevented.

When the PF regeneration progresses and the deposition amount is decreased, the soot regeneration amount per unit time will be reduced and the regeneration time will be prolonged if the DPF temperature is controlled constant, possibly resulting in an increase of the risk of oil dilution. According to the invention, however, the soot regeneration amount per unit time is kept constant even after the DPF regeneration has progressed. Therefore, the regeneration time can be shortened and the oil dilution can be suppressed.

In the invention, the late post-injection control unit may preferably vary the target soot regeneration amount per unit time according to a regeneration elapsed time after the start of late post-injection, such that the target soot regeneration amount per unit time is set to a small value directly after the start of regeneration, then the set value is increased as the regeneration progresses, and the target soot regeneration amount per unit time is set to a small value again at the end of the regeneration.

In this manner, there is still deposited a large amount of soot directly after the start of regeneration, and hence the risk of excessive rise of temperature in the DPF can be minimized by lowering the target soot regeneration amount per unit time.

The target soot regeneration amount per unit time is increased as the regeneration processes, whereby the regeneration time can be shortened and the risk of oil dilution can be reduced.

In a final stage of the regeneration, the target soot regeneration amount per unit time is again reduced so that the soot regeneration amount per unit time is prevented from becoming too large and the risk of excessive rise of temperature can be reduced.

In the invention, the late post-injection control unit may preferably vary the target soot regeneration amount per unit time according to an amount of the accumulated soot after the start of late post-injection, such that the target soot regeneration amount per unit time is set to a small value directly after the start of regeneration, then the set value is increased as the regeneration progresses, and the target soot regeneration amount per unit time is set to a small value again at the end of the regeneration.

In this manner, the target soot regeneration amount per unit time is varied according to an amount of the soot accumulated after the start of late post-injection, whereby the same effect can be obtained as when the target soot regeneration amount per unit time is varied according to a regeneration time elapsed after the start of late post-injection, and the risk of excessive rise of temperature and oil dilution can be reduced.

In the invention, the target soot regeneration amount per unit time may preferably be varied in multiple stages of two or more stages or in a continuous fashion.

Specifically, the target soot regeneration amount per unit time can be varied according to a regeneration time elapsed after the start of late post-injection and the target soot regeneration amount per unit time can be varied according to a soot deposition amount after the start of late post-injection, in multiple stages of two or more stages or in a continuous fashion, whereby it is made possible to set a target regeneration soot amount appropriately according to the progress of regeneration after the start of late post-injection.

In the invention, a rate limiter may preferably be provided so that the soot regeneration amount per unit time varies slowly toward the target soot regeneration amount per unit time directly after the start of late post-injection.

In this manner, a rate limiter is provided, that is, a limit is established on the rate of increase of soot regeneration amount per unit time, whereby the overshoot of the soot regeneration amount per unit time directly after the start of regeneration can be prevented and the excessive rise of temperature can be prevented.

In the invention, an upper limit may preferably be established for the target soot regeneration amount per unit time, the upper limit being obtained based on an upper limit for the temperature of the DPF.

In this manner, an upper limit established for the target soot regeneration amount per unit time is obtained based on an upper limit beyond which catalyst degradation occurs in the DPF, whereby degradation of the DPF due to excessive rise of temperature can be prevented.

Further, the target soot regeneration amount per unit time upper limit may preferably be set to a fixed value that is preliminarily obtained by calculation or test, or set to such a value that the DPF temperature that is detected is increased to near a critical temperature at which degradation of the catalyst of the DPF begins.

In this manner, when an upper limit of the target soot regeneration amount per unit time is set while monitoring the DPF temperature, the target soot regeneration amount per unit time is set to a temperature at a very edge of the range where thermal deterioration of the DPF will not occur. This makes it possible to perform regeneration at a high temperature but not so high as to result in excessive rise of temperature, and thus the regeneration efficiency can be improved. Consequently, not only deterioration of the DPF due to excessive rise of temperature can be prevented but also oil dilution can be minimized.

The exhaust gas emission control system according to the invention is provided with a regeneration control device which controls a heating unit, when an amount of accumulated soot exceeds a predetermined value, to heat the DPF up to near a predetermined target temperature so as to burn and remove the accumulated soot, and the regeneration control device has a late post-injection control unit which injects fuel into a combustion chamber at a timing not contributing to combustion. The late post-injection control unit feed-back controls a late post-injection amount such that a regeneration amount of the soot regenerated by the DPF becomes a target soot regeneration amount per unit time. In other words, the late post-injection control unit controls the late post-injection amount based on a soot regeneration amount per unit time. Therefore, the invention is able to solve the problem of rapid and excessive rise of DPF temperature due to significant increase of the soot regeneration amount per unit time. Further, by setting the target soot regeneration amount per unit time in this manner to control the late post-injection amount such that the soot regeneration amount per unit time becomes the target soot regeneration amount per unit time, the DPF temperature control can be optimized and, as a result, the risk of excessive rise of temperature and oil dilution can be minimized.

BEST MODE FOR CARRYING OUT THE INVENTION

Figure 1:
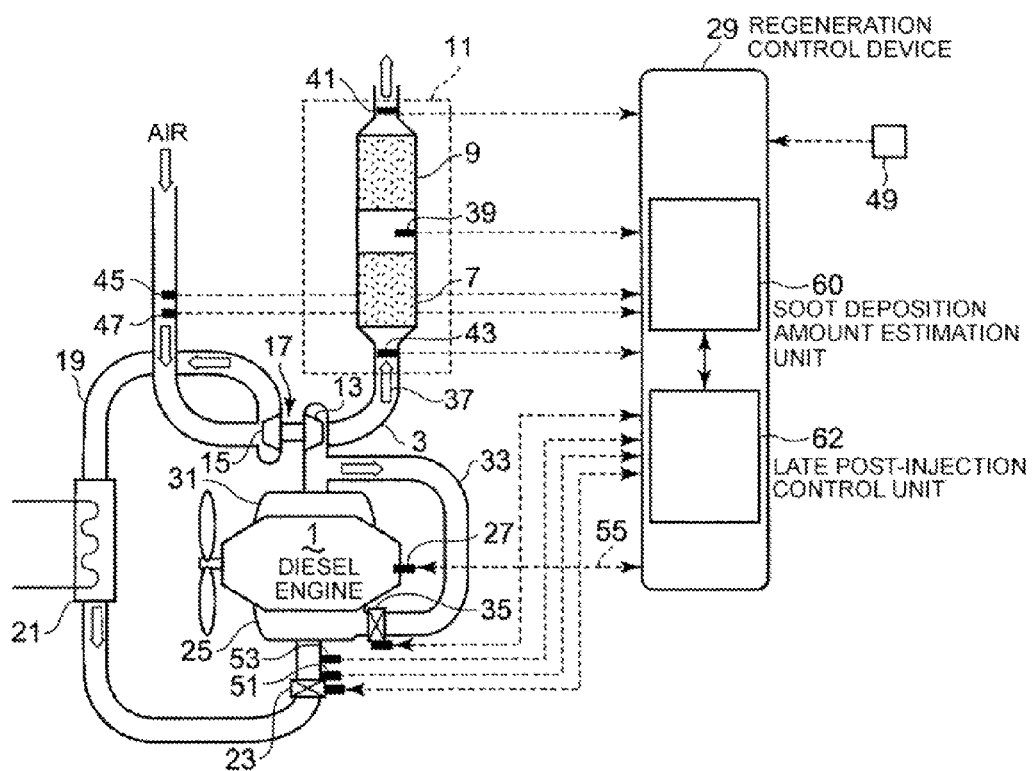
FIG. 1 is an overall configuration diagram of an exhaust gas emission control system for a diesel engine according to the invention.

The invention will be described in detail based on exemplary embodiments shown in the drawings. It should be understood, however, that the scope of the invention is not limited to dimensions, materials, shapes, and relative arrangement of components described in these embodiments unless otherwise particularly described.

Referring to FIG. 1, an overall configuration of an exhaust gas emission control system for a diesel engine according to the invention will be described.

As shown in FIG. 1, a diesel engine (hereafter, referred to as the engine) 1 has an exhaust passage 3 in which an exhaust gas post-processing device 11 is provided. The exhaust gas post-processing device 11 is composed of a DOC 7 and a DPF 9 arranged downstream of the DOC 7 to collect PM.

There is also arranged, in the exhaust passage 3, an exhaust gas turbocharger 17 having an exhaust gas turbine 13 and a compressor 15 that is coaxially driven with the exhaust gas turbine 13. Air discharged from the compressor 15 of the exhaust gas turbocharger 17 passes through the air supply passage 19 and enters an inter cooler 21, where the air is cooled. After that, the air supply flow rate is controlled by an air throttle valve 23, and then the air passes through an intake manifold 25 and then an intake port, and is introduced into a combustion chamber via an intake valve of the engine 1.

The engine 1 further has a fuel injector (not shown) for injecting fuel into the combustion chamber while controlling the injection timing, injection amount, and injection pressure of fuel, and this fuel injector is connected to a regeneration control device (ECU) 29 via a connection terminal 27.

An EGR (exhaust gas recirculation) passage 33 is branched out from midway of the exhaust passage 3 or an exhaust manifold 31 so that part of the exhaust gas is introduced into a downstream region of the air throttle valve 23 via an EGR valve 35.

Combustion gas produced by combustion in the combustion chamber of the engine 1, that is, exhaust gas 37 passes through the exhaust manifold 31 and the exhaust passage 3, and drives the exhaust gas turbine 13 of the exhaust gas turbocharger 17 to serve as a power source of the compressor 15. The exhaust gas 37 then passes through the exhaust passage 3 and flows into the exhaust gas post-processing device 11.

The regeneration control device 29 for the DPF 9 receives signals from a DPF inlet temperature sensor 39, a DPF outlet temperature sensor 41, a DOC inlet temperature sensor 43, an air flow meter 45, and an intake temperature sensor 47.

Further, the regeneration control device (ECU) 29 receives signals from the EGR valve 35, the air throttle valve 23, an engine speed sensor 49, and an intake manifold pressure sensor 51 and intake manifold temperature sensor 53 in the intake manifold 25, as well as a fuel injection amount signal 55 from the fuel injector.

There are provided, in the regeneration control device 29, a storage unit for storing various types of map data, a timer for measuring time elapsed from start of a late post fuel injection, and the like.

When the deposition amount of PM deposited on the DPF 9 exceeds a predetermined value, the regeneration control device 29 controls the heating unit to raise the inlet temperature of the DPF 9 to near the target set temperature (610 to 650° C.) so that the deposited PM is burned and removed.

Burning and removal of the PM by the regeneration control device 29 will be described schematically below.

Once forced regeneration is started according to a determination based on conditions for starting the forced regeneration, such as travel distance, engine operating hours, total fuel consumption, estimated soot deposition amount, and the like, DOC temperature rising control is performed to activate the DOC 7. In this DOC temperature rising control, the opening of the air throttle valve 23 is narrowed to reduce the amount of air flowing into the combustion chamber, whereby the exhaust gas temperature is raised. Further, directly after a main injection, a first post-injection is performed by early post-injection to inject a smaller amount of fuel than the main injection in a state in which the pressure in the cylinders is still high. The exhaust gas temperature is raised by this early post-injection without affecting the engine output, and the DOC 7 is activated by this high-temperature exhaust gas flowing into the DOC 7. Thus, any unburned fuel in the exhaust gas is oxidized with the activation of the DOC 7, and the exhaust gas temperature is raised by the oxidation heat generated during the oxidation.

It is then determined whether or not the DOC inlet temperature has reached a predetermined temperature or whether or not the DPF inlet temperature has reached a predetermined temperature, and if it is determined that either the DOC inlet temperature or the DPF inlet temperature has exceeded the predetermined temperature, the inlet temperature of the DPF 9 is raised further more by late post-injection. The term "late post-injection" means a second post-injection performed after an early post-injection in a state where the crank angle approaches near the bottom dead center. This late post-injection causes the fuel to flow out of the combustion chamber to the exhaust passage 3 when an exhaust valve is open. This discharged fuel is caused to react in the already activated DOC 7 and heat of oxidation thus generated further raises the exhaust gas temperature to a temperature required for regeneration of the DPF 9, for example, to 610 to 650° C. to promote combustion of PM.

The regeneration control device 29 further has a soot deposition amount estimation unit 60 to be used in the determination of the conditions for starting forced regeneration of the DPF, and a late post-injection control unit 62 for controlling the aforementioned late post-injection amount.

Figure 3:
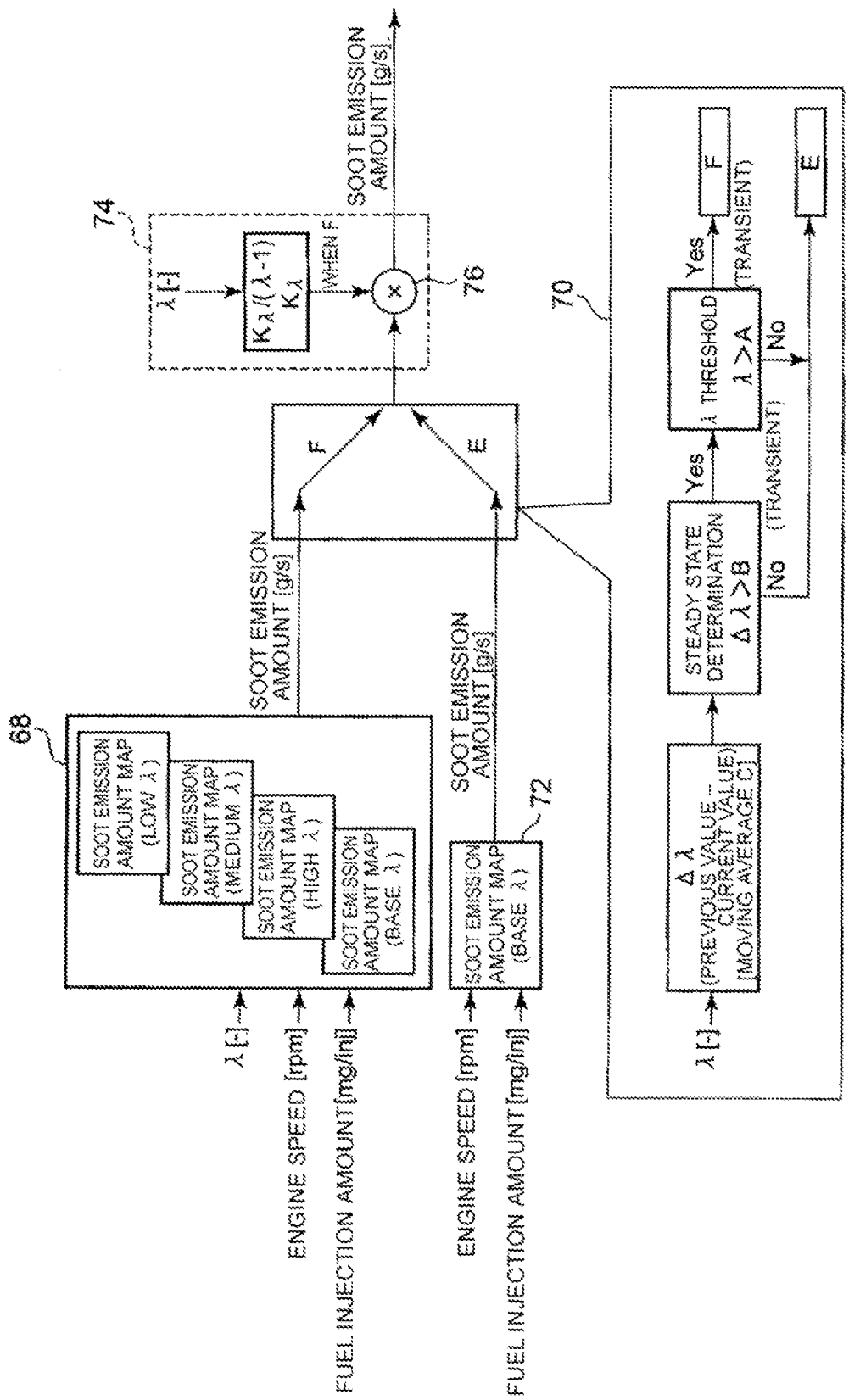
FIG. 3 is a configuration block diagram of a soot emission amount calculation unit forming the soot deposition amount estimation unit.
Figure 4:
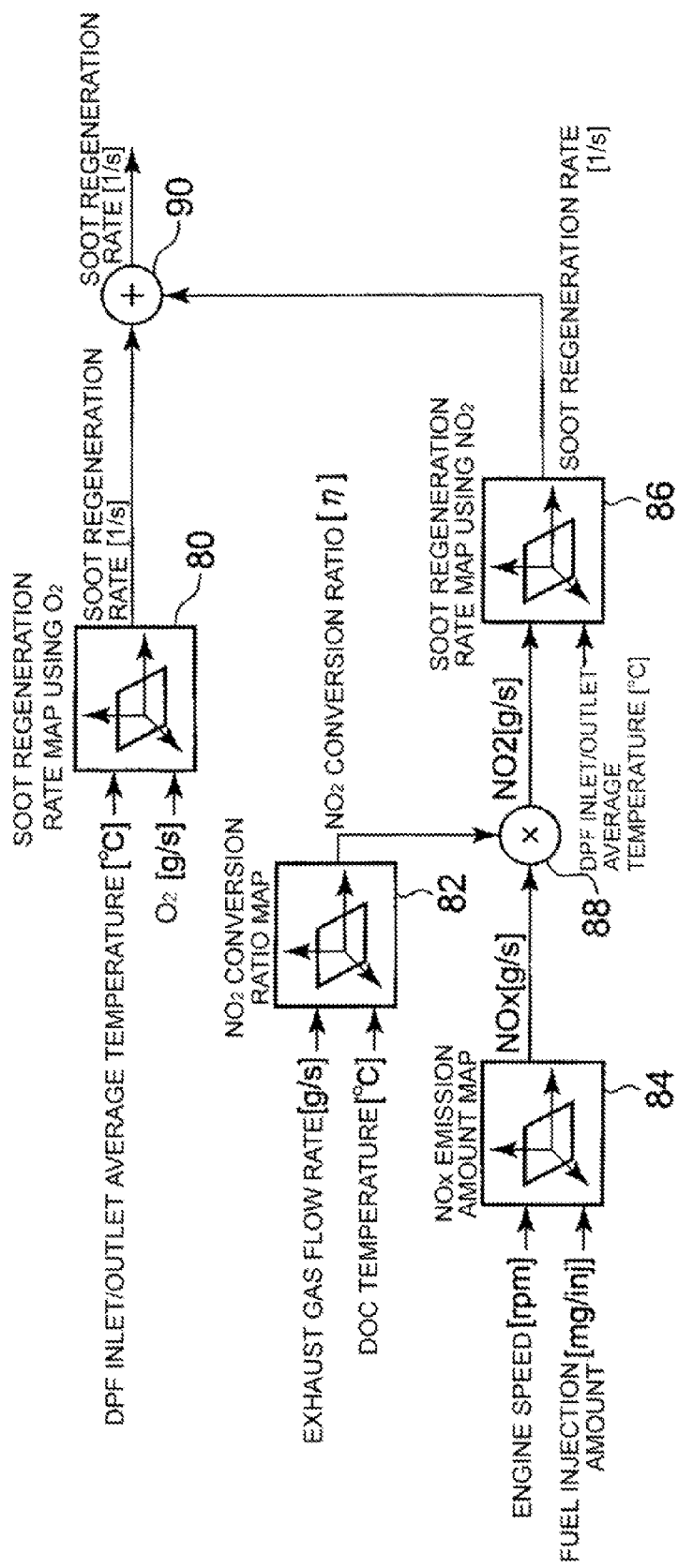
FIG. 4 is a configuration block diagram of a soot regeneration rate calculation unit forming the soot deposition amount estimation unit.

The soot deposition amount estimation unit 60 will be described with reference to FIGS. 2 to 4. The soot deposition amount estimation unit 60 calculates an amount of soot accumulated on the DPF 9 always based on an operating state of the engine regardless of whether or not DPF 9 is regenerated.

Figure 2:
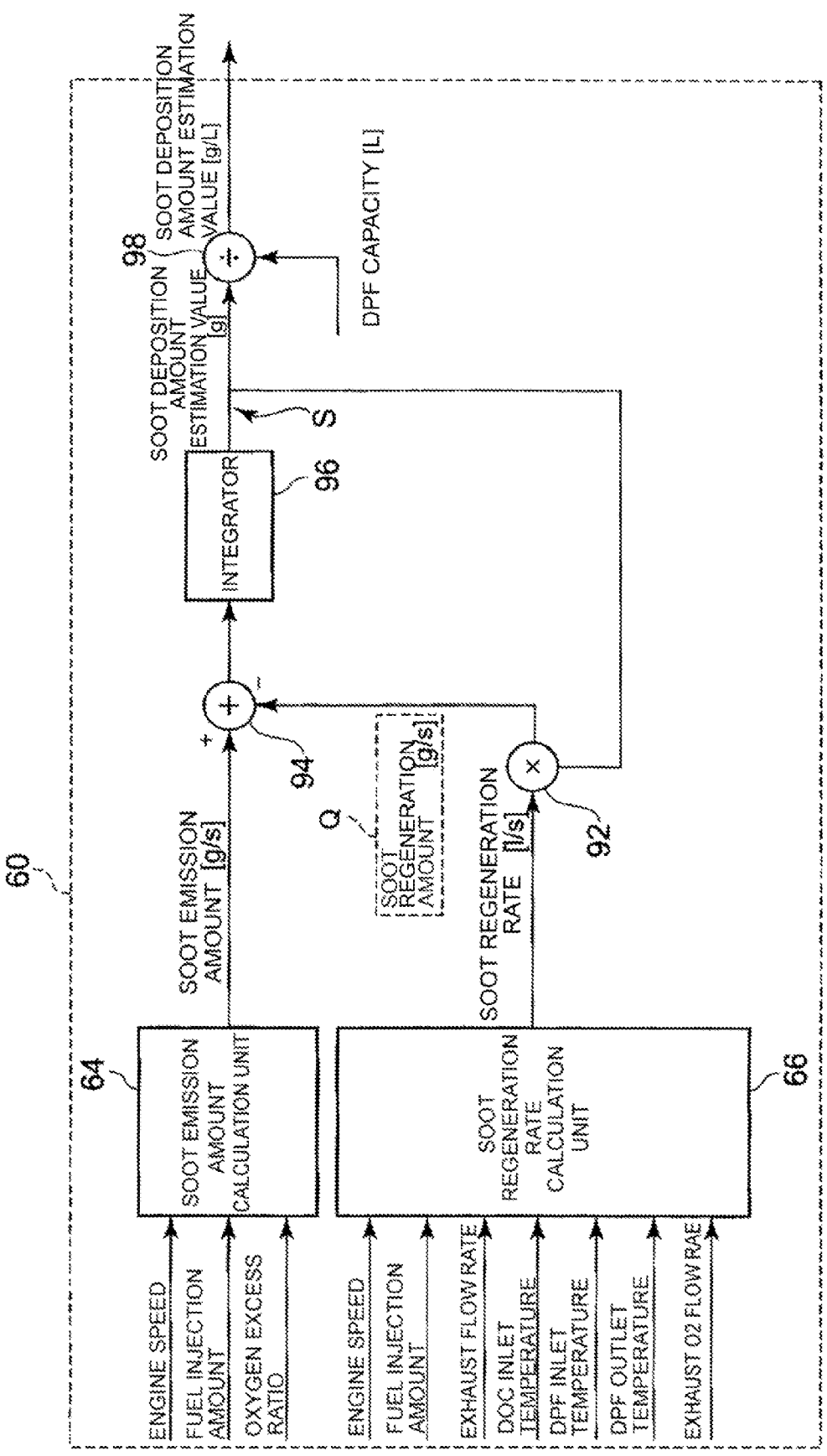
FIG. 2 is a configuration block diagram of a soot deposition amount estimation unit.

As shown in FIG. 2, the soot deposition amount estimation unit 60 has a soot emission amount calculation unit 64, and a soot regeneration rate calculation unit 66. The soot emission amount calculation unit 64 calculates a soot emission amount based on detection signals or calculated values of engine speed, fuel injection amount, and oxygen excess ratio. Specifically, as shown in FIG. 3, a soot emission amount map 68 according to an air fuel ratio $\lambda$ is provided. It is determined by a transient state determination unit 70 whether or not the state is a transient state based on a change of air fuel ratio $\lambda$. When it is determined that the state is not a transient state, a soot emission amount is calculated by using a soot emission amount map 72 using a base $\lambda$ along the route indicated by the symbol E. The transient state determination unit 70 determines whether the state is transient state F or steady state E based on a difference in moving average $\Delta\lambda$ between previous and current values of air fuel ratio, and based on a comparison result between $\Delta\lambda$ and a threshold and a comparison result between a current air fuel ratio $\lambda$ and a threshold.

When it is determined that the state is a transient state, the soot emission amount map 68 according to the air fuel ratio $\lambda$ is used along the route indicated by the symbol F to calculate a soot emission amount. When the state is the transient state, a correction coefficient according to an air fuel ratio $\lambda$ is calculated by a soot emission amount correction unit 74, and is multiplied by the integrator 76 to correct the soot emission amount.

The soot regeneration rate calculation unit 66 calculates a soot regeneration rate based on calculated values obtained by using detection signals of engine speed, fuel injection amount, exhaust gas flow rate, DOC inlet temperature, DPF inlet temperature, and DPF outlet temperature, and a calculated value of exhaust $O_2$ flow rate calculated by using a predetermined formula. Specifically, as shown in FIG. 4, the soot regeneration rate calculation unit 66 has a soot regeneration rate map with $O_2$ 80, a $NO_2$ conversion ratio map 82, a NOx emission amount map 84, and a soot regeneration rate map with $NO_2$ 86.

The soot regeneration rate map with $O_2$ 80 is principally used for calculation in forced regeneration, while an arithmetic expression may be used in place of the map. The following equation (2) described before is used as the arithmetic expression.

Soot regeneration rate $[1/s]=A\times\exp(-B/RT)\times QO_2^\gamma$ (2)

where A, B, and $\gamma$ each denote a constant, R denotes a gas constant, T denotes DPF temperature [K], and $QO_2^\gamma$ denotes a $O_2$ flow rate [g/s].

A NOx emission amount according to an engine operating state is calculated by the NOx emission amount map 84, a conversion ratio from NOx to $NO_2$ is calculated by the $NO_2$ conversion ratio map 82, and the conversion ratio to $NO_2$ is multiplied by the NOx emission amount by the integrator 88. A rate of soot regeneration caused by $O_2$ that is generated when NOx is converted into $NO_2$ is calculated by the soot regeneration rate map 86 with $O_2$, and a result of this calculation is added by an adder 90 to a calculated value from the soot regeneration rate map 80 with $O_2$, and a result of the addition is output.

Returning to FIG. 2, the soot regeneration rate calculated by the soot regeneration rate calculation unit 66 is multiplied by the estimated soot deposition amount by the integrator 92 to calculate a soot regeneration amount per unit time. This soot regeneration amount per unit time is subtracted by the adder 94 from the soot emission amount calculated by the soot emission amount calculation unit 64, in other words, the regeneration amount is subtracted from the emission amount so that a deposition amount is thereby estimated.

The output from the adder 94 is integrated by an integrator 96 and an estimated soot deposition amount is calculated. The estimated soot deposition amount is divided by a DPF capacity by a divider 98, and a division result is output as a deposition amount per unit capacity.

First Embodiment

A first embodiment of the late post-injection control unit 62 provided in the regeneration control device 29 to control the late post-injection amount will be described with reference to FIGS. 5 and 6.

The late post-injection control unit 62 is characterized by feedback controlling the late post-injection amount so that the soot regeneration amount per unit time regenerated by the PPF 9 becomes a target soot regeneration amount per unit time.

Figure 5:
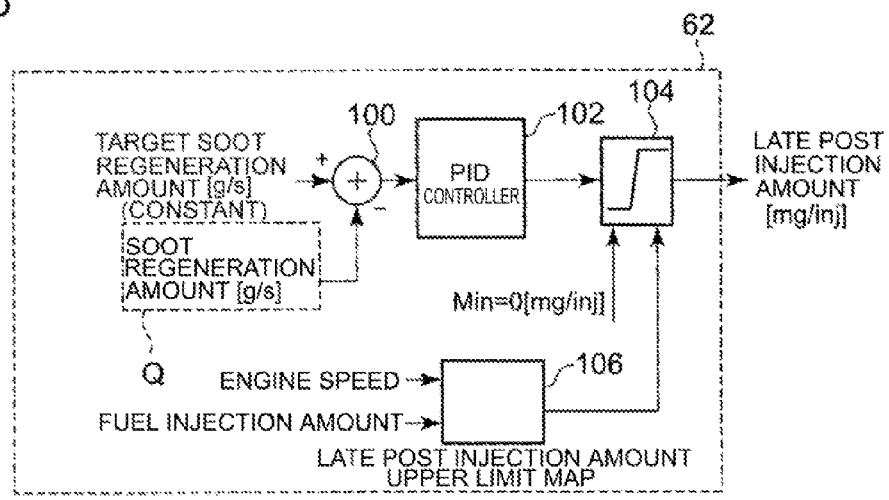
FIG. 5 is a configuration block diagram showing a late post-injection control unit according to a first embodiment.

As shown in FIG. 5, the target soot regeneration amount per unit time is set to a constant, whereas the soot regeneration amount per unit time is calculated based on an actual engine operating state, and these regeneration amounts are input to an adder 100 which calculates a difference between them. The difference is subjected to feedback PID arithmetic processing by a PID controller 102, and the result is output with its upper limit restricted by a late post-injection amount limiter 104.

When the soot deposition amount is too small, the soot regeneration amount per unit time will be small and the late post-injection amount will be too great, which may possibly cause excessive rise of temperature. Therefore, a limiter is provided to limit the late post-injection amount. The limiter sets an upper limit for the inlet temperature of the DPF 9, for example, at 700° C. Since the value to be set for the late post-injection amount differs depending on an operating state (exhaust flow rate and exhaust temperature), an upper limit is set by a late post-injection amount upper limit map (using engine speed and fuel injection amount as parameters) 106.

Figure 6:
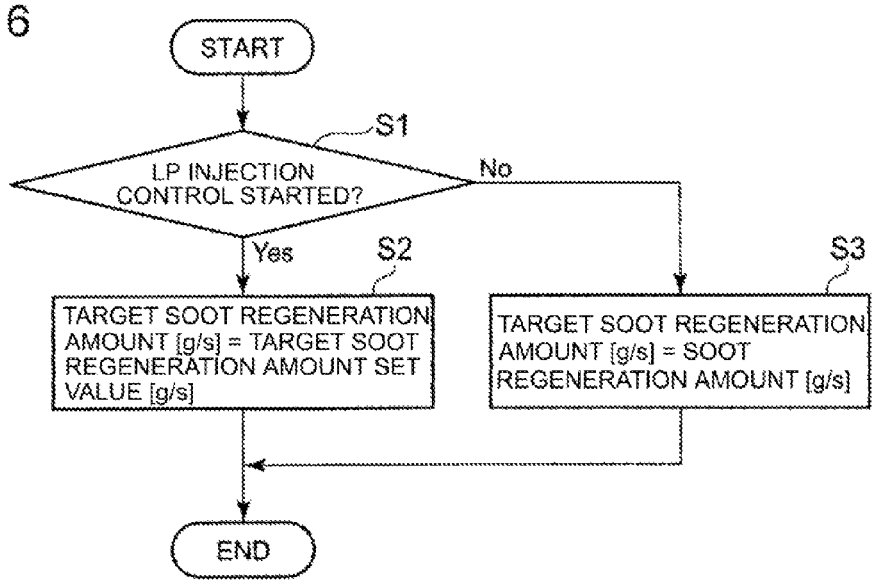
FIG. 6 is a flowchart showing a setting logic for setting a target soot regeneration amount per unit time.

As shown in FIG. 6, a target soot regeneration amount per unit time setting logic determines in step S1 whether or not the late post-injection control has been started. If the late post-injection control has been started, the target soot regeneration amount per unit time set value is set to the target soot regeneration amount per unit time in step S2, whereas if the late post-injection control has not been started, the target soot regeneration amount per unit time is set in step S3 to a soot regeneration amount per unit time that is calculated based on an actual engine operating state so as to null the difference and to avoid accumulation of data in the integrator in the PID controller 102.

The soot regeneration amount per unit time calculated based on an actual engine operating state is provided by the regeneration amount indicated in the portion Q for calculating a soot regeneration amount per unit time as shown in the arithmetic operation of the soot regeneration amount per unit time in FIG. 2.

According to the first embodiment described above, the late post-injection amount is controlled based on a soot regeneration amount per unit time, which makes it possible to solve the problem that the DPF temperature rapidly rises excessively due to substantial increase of the soot regeneration amount per unit time. Thus, a target soot regeneration amount per unit time is set and the late post-injection amount is controlled so that the soot regeneration amount per unit time becomes this target soot regeneration amount per unit time, whereby the control of the temperature of the DPF 9 is optimized and as a result the risk of excessive rise of temperature and oil dilution can be minimized.

The target soot regeneration amount per unit time is set to a fixed value to control the soot regeneration amount per unit time constant, whereby the risk of rapid burning of the soot can be reduced and the excessive rise of temperature can be prevented.

When the PF regeneration progresses further and the deposition amount is reduced, the soot regeneration amount per unit time will be decreased and the regeneration time will be increased if the DPF temperature is set to a fixed value. This will increase the risk of oil dilution. According to the embodiment, however, even when the DPF regeneration progresses, the soot regeneration amount per unit time is maintained constant, and hence the regeneration time is shortened, whereby oil dilution can be suppressed.

Second Embodiment

A second embodiment of the late post-injection control unit 62 will be described with reference to FIGS. 7 to 9.

The second embodiment is different from the first embodiment only in the setting of the target soot regeneration amount per unit time, while the other features are the same as those of the first embodiment. Accordingly, like components are assigned with like reference numerals or symbols and description thereof will be omitted.

Figure 7:
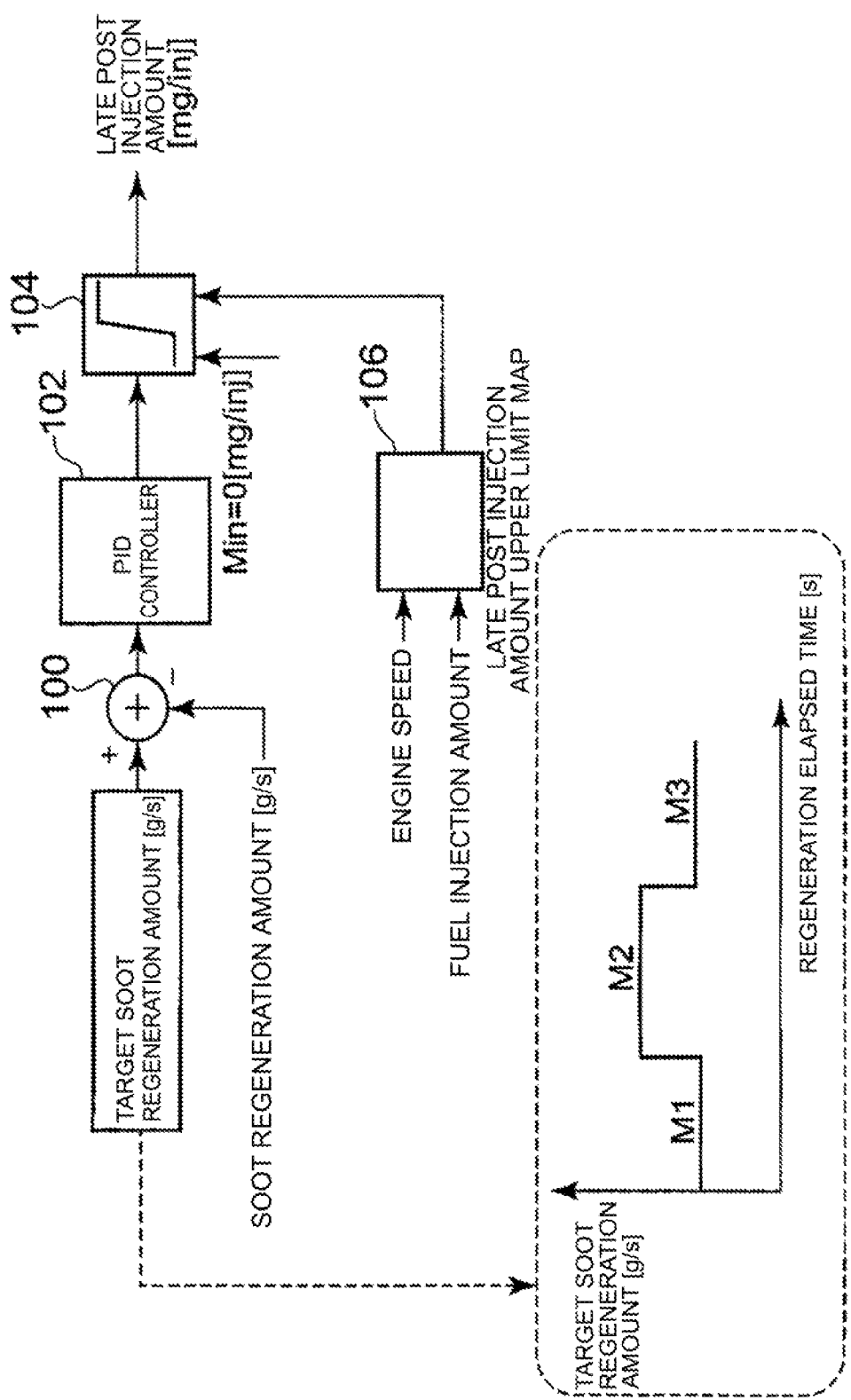
FIG. 7 is a configuration block diagram according to a second embodiment.

As shown in FIG. 7, the target soot regeneration amount per unit time is changed according to regeneration time elapsed after the start of late post-injection. The target soot regeneration amount per unit time is changed such that it is set to a small value in a stage M1 directly after the start of regeneration, whereas it is set to a greater value than the one in the stage M1 in an intermediate stage M2 where the regeneration has progressed. In a final stage M3, the target soot regeneration amount per unit time is again set to a smaller value than the one in the stage M2.

Since the temperature of the DPF 9 is low and the soot regeneration amount per unit time is small in the stage M1 directly after the start of regeneration, the late post-injection amount possibly becomes too large. In addition, since a large amount of soot has likely been deposited directly after the start of regeneration, the target soot regeneration amount per unit time is set to a small value.

In the final stage M3, toward the end of the regeneration, the regeneration has progressed and the soot deposition amount has been decreased, whereby the soot regeneration amount per unit time becomes small and hence the late post-injection amount becomes excessively large. This increases the risk that the upper limit of the late post-injection amount is continued to be updated, or the temperature rises excessively. Therefore, the target soot regeneration amount per unit time is set to a smaller value in the stage M3 than in the stage M2 so that the target soot regeneration amount per unit time is optimized toward the end of the regeneration.

A specific target soot regeneration amount per unit time is obtained by calculation using the equations (1) and (2) above based on the two parameters of soot deposition amount and DPF temperature for each of the stage directly after the start of regeneration, the intermediate stage, and the final stage.

Next, a specific control flow will be described with reference to FIG. 8.

In step S11, it is determined whether or not a late post (LP) injection control has been started. When it has been started, the control proceeds to step S12, and it is determined whether or not the regeneration time elapsed from the start of the late post-injection control is equal to or more than the regeneration elapsed time threshold. When the elapsed time is not more than the threshold, the control proceeds to step S14, in which the target soot regeneration amount per unit time is set to a set value for the first stage. When it is determined in step S12 that the elapsed time is equal to or greater than the threshold, the control proceeds to step S13, in which the target soot regeneration amount per unit time is set to a set value for the second stage.

When it is determined in step S11 that the late post (LP) injection control has not been started, the control proceeds to step S15, in which the target soot regeneration amount per unit time is set to an actual soot regeneration amount per unit time.

Figure 8:
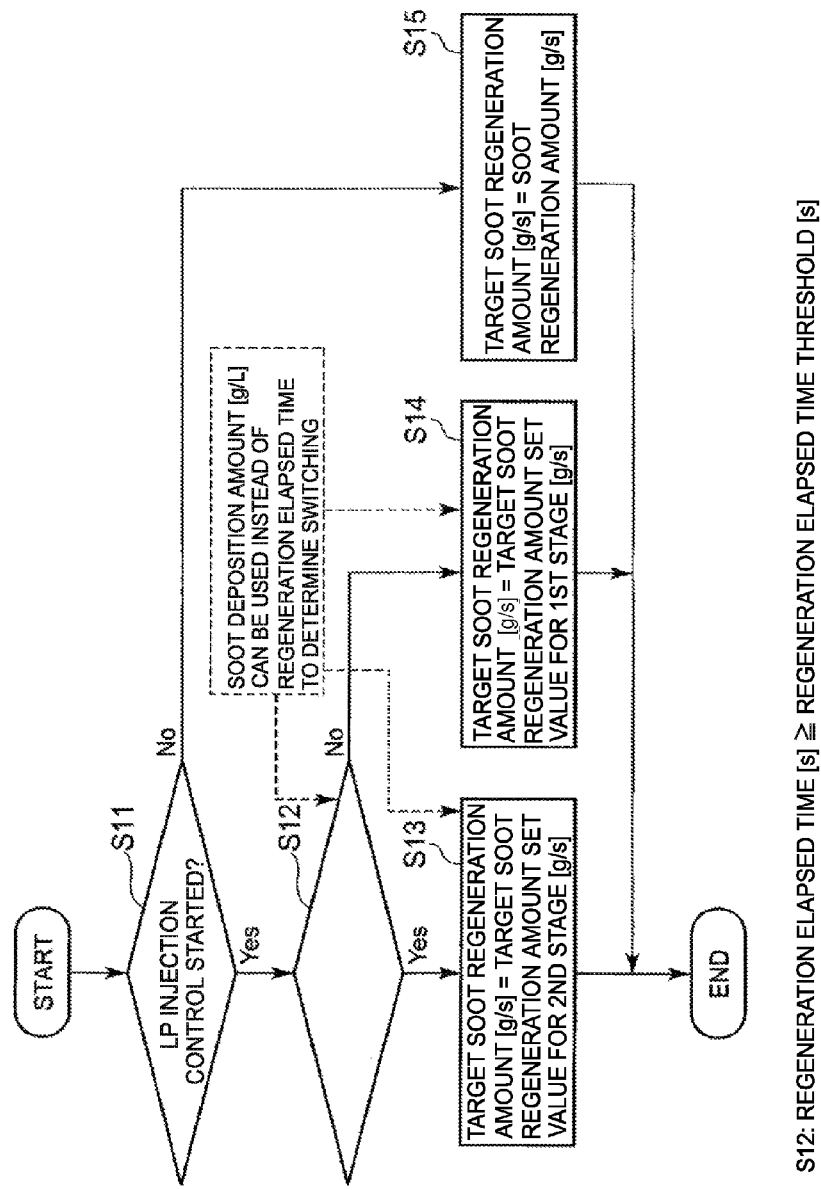
FIG. 8 is a control flowchart according to the second embodiment.
Figure 9:
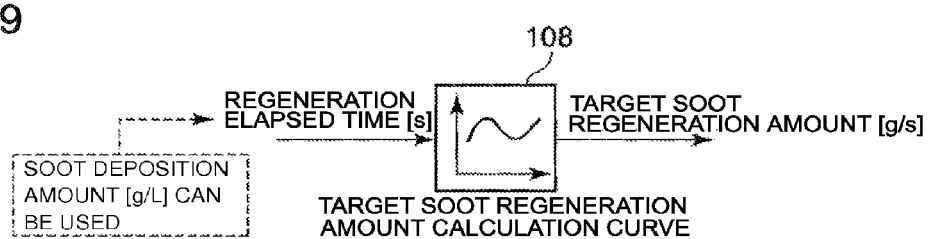
FIG. 9 is an explanatory diagram showing a modification of the second embodiment.

Although in the flowchart of FIG. 8, the switching is done in two stages, the switching may be done in three stages as shown in FIG. 7 or may be done in more stages. Furthermore, the target soot regeneration amount per unit time may be changed in a continuous fashion instead of in multiple stages. In this case, the target soot regeneration amount per unit time can be calculated by using a target soot regeneration amount per unit time calculation curve 108 established according to a regeneration elapsed time as shown in FIG. 9. Alternatively, the target soot regeneration amount per unit time may be calculated by using a linear arithmetic expression or the calculation curve thereof. In this manner, an optimal target soot regeneration amount per unit time can be set according to progress of regeneration after the start of late post-injection.

Still further, a soot deposition amount instead of regeneration elapsed time can be used to determine whether or not the target amount is to be switched. In this case, the estimated soot deposition amount (output value of the part indicated by the symbol S) shown in FIG. 2 may be used as the soot deposition amount so that the switching is done according to a decrease of the soot deposition amount.

According to the second embodiment described above, since a large amount of soot is still deposited directly after the start of regeneration, the risk of excessive rise of DPF temperature can be reduced by setting the target soot regeneration amount per unit time to a small value.

Since the target soot regeneration amount per unit time is increased in the intermediate stage of regeneration, the regeneration time can be shortened and hence the risk of oil dilution can be reduced.

In the final stage of regeneration, the target soot regeneration amount per unit time is again reduced to prevent the soot regeneration amount per unit time from becoming too large, whereby the risk of the excessive rise of temperature can be reduced.

Consequently, the regeneration temperature and regeneration time can be optimized to minimize the risk of excessive rise of temperature and oil dilution.

Third Embodiment

A third embodiment of the late post-injection control unit 62 will be described with reference to FIGS. 10 to 12.

The third embodiment is characterized by a rate limiter 110 that is provided to ensure gradual change toward the target soot regeneration amount per unit time directly after the start of late post-injection.

The other configuration features are the same as those of the first embodiment. Therefore, like components are assigned with like reference numerals or symbols and description thereof will be omitted.

Figure 10:
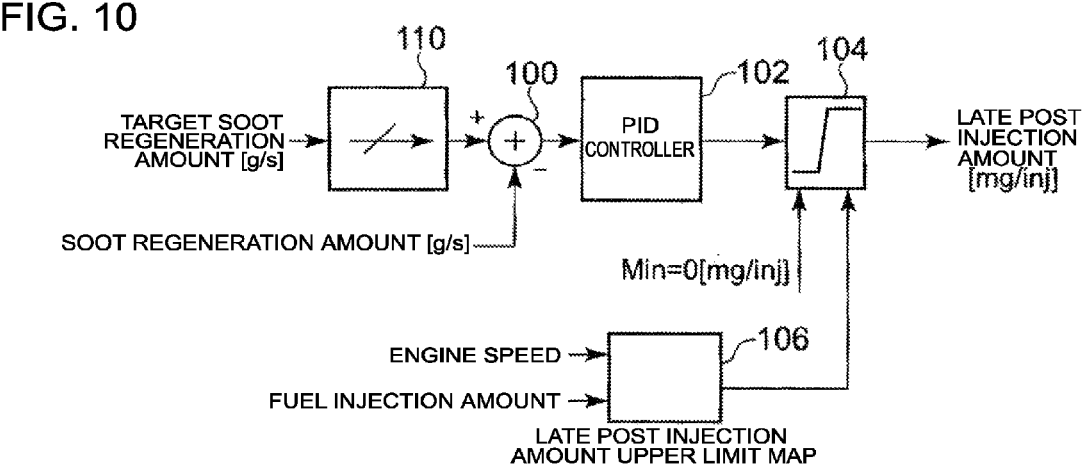
FIG. 10 is a configuration block diagram according to a third embodiment.
Figure 11:
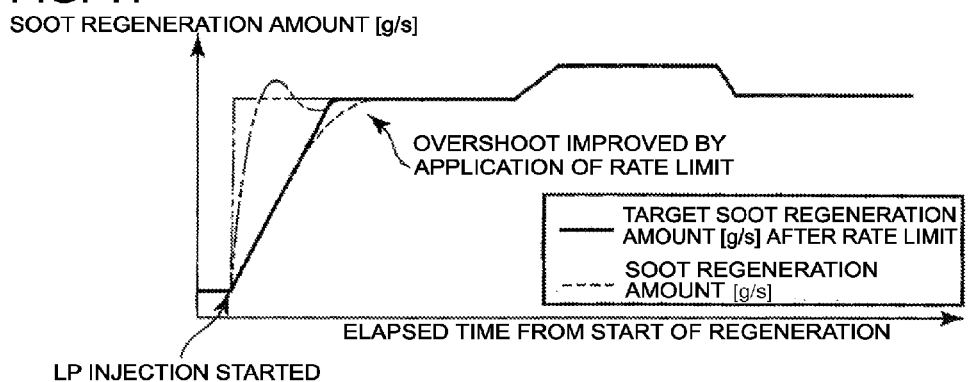
FIG. 11 is an explanatory diagram showing a changing state of a soot regeneration amount per unit time according to the third embodiment.

As shown in FIG. 10, a rate limiter 110 is provided in a circuit in which a signal indicating a target soot regeneration amount per unit time is input to the adder 100. This improves the overshoot of the soot regeneration amount per unit time, and prevents the excessive rise of temperature. In FIG. 11, the bold and thin two-dot chain lines represent cases in which the rate limiter is not applied, while the bold and thin solid lines represent cases in which the rate limiter is applied. As seen therefrom, the overshoot of soot regeneration amount per unit time can be improved when the rate limiter is applied than when the rate limiter is not applied.

The rate limiter may have an inclined section defined by multiple stages.

Figure 12:
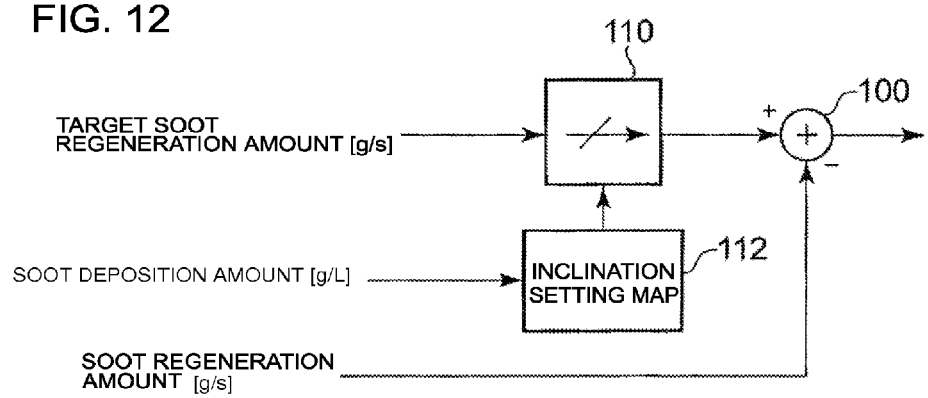
FIG. 12 is an explanatory diagram showing a modification of the third embodiment.

Further, as shown in FIG. 12, an inclination setting map 112 may be provided by using a soot deposition amount (estimated soot deposition amount (output value of the part indicated by the symbol S) in FIG. 2), so that the degree of inclination in the inclined section of the rate limiter is changed according to the soot deposition amount.

By setting the degree of inclination according to a soot deposition amount, the problem of oil dilution can be avoided, that is caused by prolonged processing time due to unnecessarily slow change.

Thus, the provision of the rate limiter 110 makes it possible to limit the rate of increase of the soot regeneration amount per unit time. Accordingly, the overshoot of soot regeneration amount per unit time directly after the start of regeneration and the excessive rise of temperature can be prevented.

Fourth Embodiment

A fourth embodiment of the late post-injection control unit 62 will be described with reference to FIG. 13.

In the fourth embodiment, an upper limit is set for the target soot regeneration amount per unit time. Like components to those of the first embodiment are assigned with like reference numerals or symbols and description thereof will be omitted.

Figure 13:
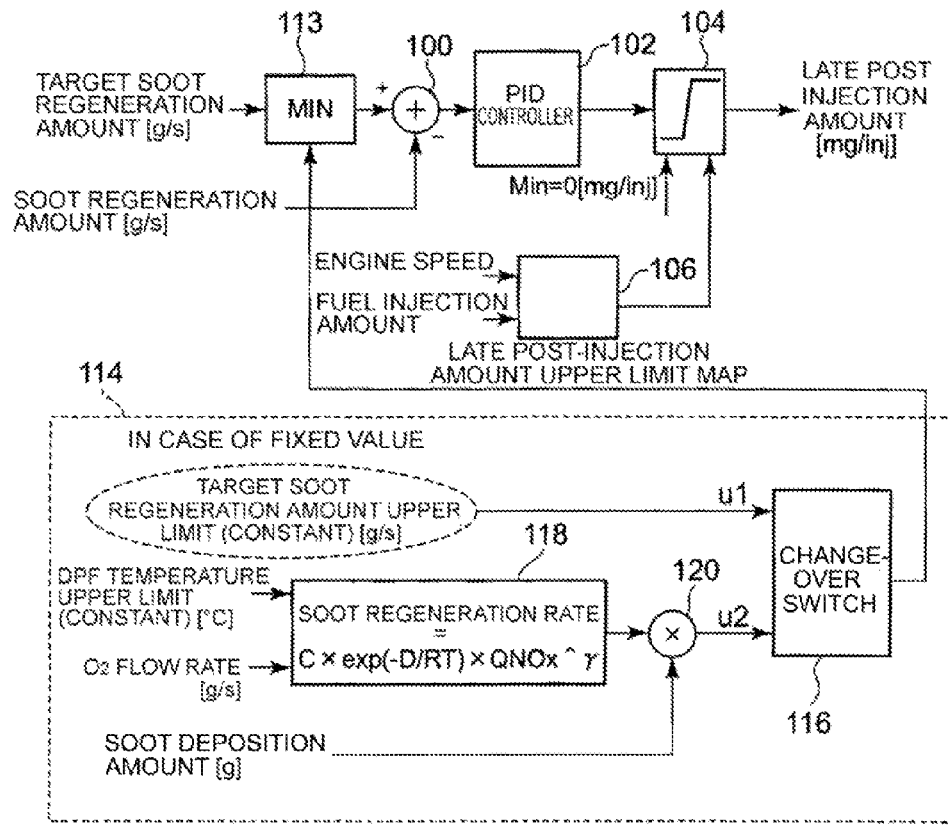
FIG. 13 is a configuration block diagram according to a fourth embodiment.
Figure 14:
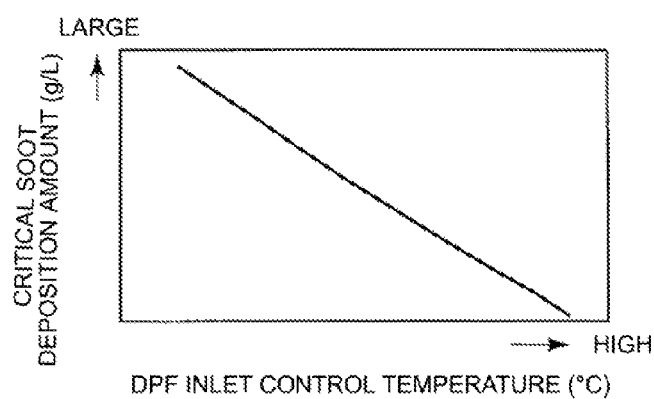
FIG. 14 is an explanatory diagram showing a relationship between DPF inlet control temperature and critical soot deposition amount.
Figure 15:
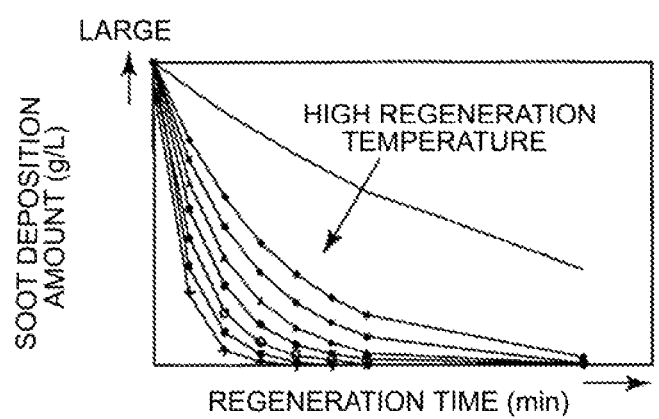
FIG. 15 is an explanatory diagram showing a relationship between regeneration time and soot deposition amount.
Figure 16:
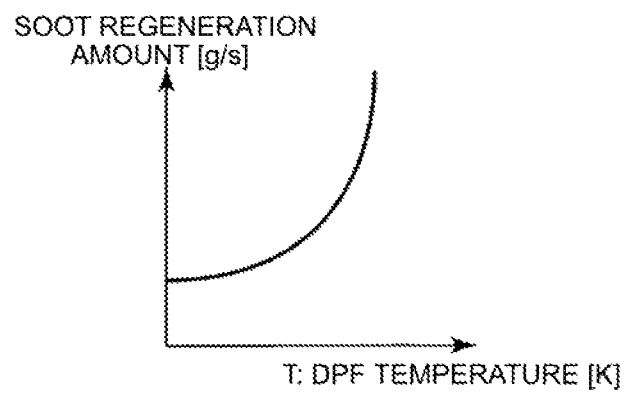
FIG. 16 is an explanatory diagram showing a relationship between DPF temperature and soot regeneration amount per unit time.

As shown in FIG. 13, a selector 113 is provided in a circuit in which a signal indicating a target soot regeneration amount per unit time is input to the adder 100 so that the selector 113 selects a smaller one. Specifically, a signal from a target soot regeneration amount per unit time upper limit setting unit 114 is input to the selector 113, which selects a smaller one between a target soot regeneration amount per unit time upper limit signal and a target soot regeneration amount per unit time signal, and outputs the selected signal to the adder 100.

Further, as shown in FIG. 13, the target soot regeneration amount per unit time upper limit setting unit 114 is provided with a change-over switch 116. The change-over switch 116 receives a target soot regeneration amount per unit time upper limit signal u1 that is set as a fixed value.

The target soot regeneration amount per unit time upper limit setting unit 114 is further provided with a soot regeneration rate calculation unit 118 for calculating a soot regeneration rate. In the soot regeneration rate calculation unit 118, a soot regeneration rate is calculated by using the equation (2) based on a DPF temperature upper limit and an $O_2$ flow rate, and the integrator 120 multiplies the calculated soot regeneration rate by the soot deposition amount to provide a target soot regeneration amount per unit time.

A signal u2 indicating this target soot regeneration amount per unit time is input to the change-over switch 116.

By switching the change-over switch 116, the target soot regeneration amount per unit time upper limit that is obtained based on an upper limit for temperature of the DPF 9 can be set as a fixed value that is preliminarily obtained by calculation or tests. Alternatively, the target soot regeneration amount per unit time upper limit can be regulated and set while monitoring the DPF temperature such that DPF temperature is caused to rise very close to the upper limit of a temperature range in which catalyst degradation of the DPF will not occur.

In other words, the target soot regeneration amount per unit time upper limit can be set to a value very close to the upper limit of a temperature range where catalyst degradation of the DPF will not occur, by regulating the DPF temperature upper limit as an input signal to the soot regeneration rate calculation unit 118 while monitoring the DPF internal temperature.

When the target soot regeneration amount per unit time upper limit is set in this manner while monitoring the DPF temperature, the target soot amount is set a temperature at a very edge of the range where thermal deterioration of the DPF will not occur. Therefore, the regeneration can be performed at a high temperature but not so high as to result in excessive rise of temperature and thus the regeneration efficiency can be improved. Consequently, not only deterioration of the DPF due to excessive rise of temperature can be prevented but also oil dilution can be minimized.

It should be understood that the third and fourth embodiments can be combined with the first embodiment or the second embodiment as required.

INDUSTRIAL APPLICABILITY

The invention is suitably applicable to exhaust gas emission control system for use in diesel engines since, according to the invention, the DPF inlet temperature can be stably controlled at a target temperature even when the exhaust gas flow rate continues to be low after the exhaust gas flow rate is decreased.

The invention claimed is:

1. An exhaust gas emission control system for a diesel engine as an internal combustion engine, comprising, in an exhaust passage, an oxidation catalyst (DOC) and a diesel particulate filter (DPF) for collecting soot in exhaust gas so that the soot collected by the DPF is regenerated, the exhaust gas emission control system further comprising:
   an electronic control unit; and
   a memory storing instructions that, when executed by the electronic control unit, cause the exhaust gas emission control system to:
      control, when an amount of accumulated soot exceeds a predetermined value, a unit to heat the DPF up to near a predetermined target temperature so as to burn and remove the accumulated soot;
      inject fuel into a combustion chamber at a timing not contributing to combustion; and
      control a late post-injection amount such that a regeneration amount per unit time of the soot regenerated by the DPF becomes a target soot regeneration amount per unit time,
   wherein the target soot regeneration amount per unit time is varied according to a regeneration elapsed time after the start of late post-injection, such that the target soot regeneration amount per unit time is set to a small value directly after the start of regeneration, then the set value is increased as the regeneration progresses, and the target soot regeneration amount per unit time is set to a small value again at the end of the regeneration.

2. The exhaust gas emission control system for a diesel engine according to claim 1, wherein the target soot regeneration amount per unit time is varied in multiple stages of two or more stages or in a continuous fashion.

3. The exhaust gas emission control system for a diesel engine according to claim 1, wherein a rate limiter is provided so that the soot regeneration amount per unit time varies slowly toward the target soot regeneration amount per unit time directly after the start of late post-injection.

4. The exhaust gas emission control system for a diesel engine according to claim 1, wherein an upper limit is established for the target soot regeneration amount per unit time, the upper limit being obtained based on an upper limit for the temperature of the DPF.

5. The exhaust gas emission control system for a diesel engine according to claim 4, wherein the upper limit of the target soot regeneration amount per unit time is set to a fixed value that is preliminarily obtained by calculation or test, or set to such a value that the DPF temperature that is detected is increased to near a critical temperature at which degradation of the catalyst of the DPF begins.

6. An exhaust gas emission control system for a diesel engine as an internal combustion engine, comprising, in an exhaust passage, an oxidation catalyst (DOC) and a diesel particulate filter (DPF) for collecting soot in exhaust gas so that the soot collected by the DPF is regenerated, the exhaust gas emission control system further comprising:
   an electronic control unit; and
   a memory storing instructions that, when executed by the electronic control unit, cause the exhaust gas emission control system to:
      control, when an amount of accumulated soot exceeds a predetermined value, a unit to heat the DPF up to near a predetermined target temperature so as to burn and remove the accumulated soot;
      inject fuel into a combustion chamber at a timing not contributing to combustion; and
      control a late post-injection amount such that a regeneration amount per unit time of the soot regenerated by the DPF becomes a target soot regeneration amount per unit time,
   wherein the target soot regeneration amount per unit time is varied according to an amount of the accumulated soot after the start of late post-injection, such that the target soot regeneration amount per unit time is set to a small value directly after the start of regeneration, then the set value is increased as the regeneration progresses, and the target soot regeneration amount per unit time is set to a small value again at the end of the regeneration.

7. The exhaust gas emission control system for a diesel engine according to claim 6, wherein the target soot regeneration amount per unit time is varied in multiple stages of two or more stages or in a continuous fashion.

8. The exhaust gas emission control system for a diesel engine according to claim 6,
   wherein a rate limiter is provided so that the soot regeneration amount per unit time varies slowly toward the target soot regeneration amount per unit time directly after the start of late post-injection.

9. The exhaust gas emission control system for a diesel engine according to claim 6,
   wherein an upper limit is established for the target soot regeneration amount per unit time, the upper limit being obtained based on an upper limit for the temperature of the DPF.

10. The exhaust gas emission control system for a diesel engine according to claim 9,
    wherein the upper limit of the target soot regeneration amount per unit time is set to a fixed value that is preliminarily obtained by calculation or test, or set to such a value that the DPF temperature that is detected is increased to near a critical temperature at which degradation of the catalyst of the DPF begins.

* * * * *